(12) United States Patent
Dantrey

(10) Patent No.: US 9,152,374 B2
(45) Date of Patent: Oct. 6, 2015

(54) CONTROL AND CAPTURE OF AUDIO DATA INTENDED FOR AN AUDIO ENDPOINT DEVICE OF AN APPLICATION EXECUTING ON A DATA PROCESSING DEVICE

(71) Applicant: NVIDIA Corporation, Santa Clara, CA (US)

(72) Inventor: Ambrish Dantrey, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 173 days.

(21) Appl. No.: 13/919,002

(22) Filed: Jun. 17, 2013

(65) Prior Publication Data

US 2014/0371890 A1    Dec. 18, 2014

(51) Int. Cl.
| | |
|---|---|
| *G06F 3/16* | (2006.01) |
| *A63F 13/00* | (2014.01) |
| *G07F 17/32* | (2006.01) |
| *G06F 9/44* | (2006.01) |
| *G06F 13/10* | (2006.01) |

(52) U.S. Cl.
CPC .............. *G06F 3/165* (2013.01); *A63F 13/00* (2013.01); *G06F 3/162* (2013.01); *G06F 3/167* (2013.01); *G07F 17/3223* (2013.01); *G06F 9/4411* (2013.01); *G06F 13/105* (2013.01); *G07F 17/3204* (2013.01)

(58) Field of Classification Search
CPC ....... G06F 17/3074; G06F 3/16; G06F 3/162; G06F 3/165; G06F 3/167; G06F 12/084; G06F 9/5016; G06F 13/105; G06F 9/4411

USPC ............ 700/94; 711/130, 147; 719/322, 324, 719/327

See application file for complete search history.

(56) References Cited

U.S. PATENT DOCUMENTS

| | | | |
|---|---|---|---|
| 6,405,255 B1 * | 6/2002 | Stoltz et al. ................ | 709/231 |
| 7,774,077 B1 * | 8/2010 | Ford ............................ | 700/94 |
| 8,166,194 B2 | 4/2012 | Omiya et al. | |
| 8,170,701 B1 * | 5/2012 | Lu .............................. | 700/94 |
| 8,296,364 B2 | 10/2012 | Alexandrov et al. | |
| 2009/0089813 A1 | 4/2009 | Wihardja et al. | |
| 2012/0035752 A1 * | 2/2012 | Kohada ....................... | 700/94 |
| 2014/0052438 A1 * | 2/2014 | Yerrace et al. ............... | 700/94 |

\* cited by examiner

*Primary Examiner* — Jesse Elbin
(74) *Attorney, Agent, or Firm* — Zilka-Kotab, PC

(57) ABSTRACT

A method includes implementing an audio framework to be executed on a data processing device with a virtual audio driver component and a User Mode Component (UMC) communicatively coupled to each other. The virtual audio driver component enables modifying an original default audio endpoint device of an application executing on the data processing device to an emulated audio device associated with a new audio endpoint in response to an initiation through the application in conjunction with the UMC. The virtual audio driver component also enables registering the new audio endpoint as the modified default audio endpoint with an operating system executing on the data processing device. Further, the virtual audio driver component enables capturing audio data intended for the original default audio endpoint device at the new audio endpoint following the registration thereof to enable control of the audio data.

17 Claims, 4 Drawing Sheets

CONTROL AND CAPTURE OF AUDIO DATA INTENDED FOR AN AUDIO ENDPOINT DEVICE OF AN APPLICATION EXECUTING ON A DATA PROCESSING DEVICE

FIELD OF TECHNOLOGY

This disclosure relates generally to audio data capturing and, more particularly, to a method, a device and/or a system of control and capture of audio data intended for an audio endpoint device of an application executing on a data processing device.

BACKGROUND

A data processing device (e.g., a desktop computer, a laptop computer, a notebook computer, a netbook, a mobile device such as a mobile phone) may execute multiple applications thereon. In a shared mode of multiple applications sharing an audio endpoint device (e.g., a speaker, headphones), it may be possible to capture audio data (e.g., an audio stream) to the audio endpoint device through, for example, an audio framework executing on the data processing device. However, a gaming application may have exclusive access to the audio endpoint device. In this exclusive mode of operation, it may not be possible to capture audio data streams associated with the gaming application.

SUMMARY

Disclosed are a method, a device and/or a system of control and capture of audio data intended for an audio endpoint device of an application executing on a data processing device.

In one aspect, a method includes implementing an audio framework to be executed on a data processing device with a virtual audio driver component and a User Mode Component (UMC) communicatively coupled to each other. The data processing device includes a processor communicatively coupled to a memory. The method also includes modifying, through the virtual audio driver component, an original default audio endpoint device of an application executing on the data processing device to an emulated audio device associated with a new audio endpoint in response to an initiation through the application in conjunction with the UMC.

Further, the method includes registering, through the virtual audio driver component, the new audio endpoint as the modified default audio endpoint with an operating system executing on the data processing device, and capturing, through the virtual audio driver component, audio data intended for the original default audio endpoint device at the new audio endpoint following the registration thereof to enable control of the audio data.

In another aspect, a non-transitory medium, readable through a data processing device and including instructions embodied therein that are executable through the data processing device, is disclosed. The non-transitory medium includes instructions to implement an audio framework to be executed on the data processing device with a virtual audio driver component and a UMC communicatively coupled to each other. The data processing device includes a processor communicatively coupled to a memory. The non-transitory medium also includes instructions to modify, through the virtual audio driver component, an original default audio endpoint device of an application executing on the data processing device to an emulated audio device associated with a new audio endpoint in response to an initiation through the application in conjunction with the UMC.

Further, the non-transitory medium includes instructions to register, through the virtual audio driver component, the new audio endpoint as the modified default audio endpoint with an operating system executing on the data processing device, and instructions to capture, through the virtual audio driver component, audio data intended for the original default audio endpoint device at the new audio endpoint following the registration thereof to enable control of the audio data.

In yet another aspect, a data processing device includes a memory, a processor communicatively coupled to the memory, and an audio framework executing on a computing platform provided through the processor and the memory. The audio framework is implemented with a virtual audio driver component and a UMC communicatively coupled to each other. The virtual audio driver component is configured to enable modifying an original default audio endpoint device of an application executing on the data processing device to an emulated audio device associated with a new audio endpoint in response to an initiation through the application in conjunction with the UMC, and registering the new audio endpoint as the modified default audio endpoint with an operating system executing on the data processing device.

Also, the virtual audio driver component is configured to enable capturing audio data intended for the original default audio endpoint device at the new audio endpoint following the registration thereof to enable control of the audio data.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or a device of control and capture of audio data intended for an audio endpoint device of an application executing on a data processing device.

Although the present embodiments have been described with reference to specific example embodiments, it will be evident that various modifications and changes may be made to these embodiments without departing from the broader spirit and scope of the various embodiments.

Figure 1:
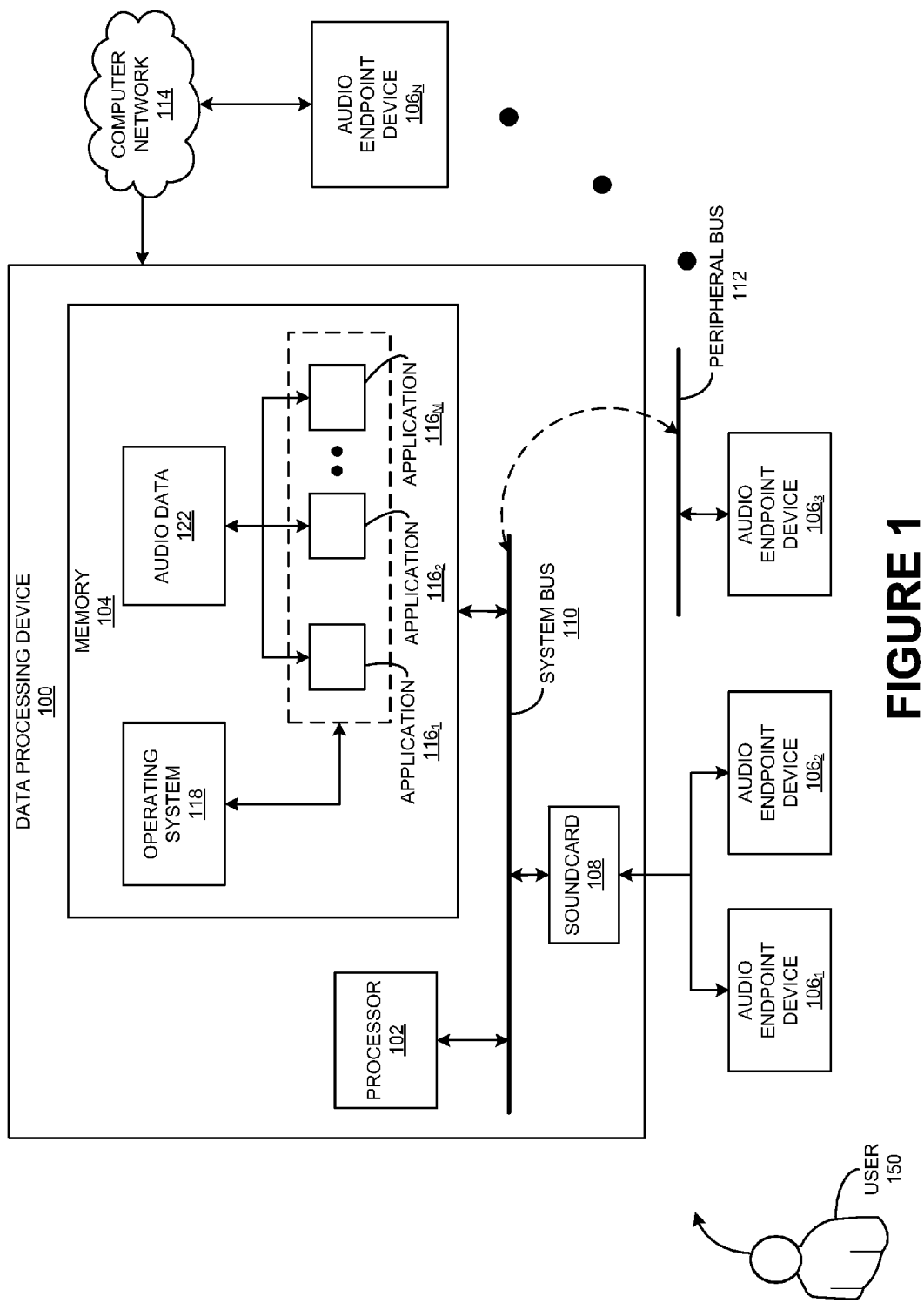
FIG. 1 is a schematic view of a data processing device, according to one or more embodiments.

FIG. 1 shows a data processing device 100, according to one or more embodiments. In one or more embodiments, data processing device 100 may include a processor 102 (e.g., a Central Processing Unit (CPU), a Graphics Processing Unit (GPU)) communicatively coupled to a memory 104 (e.g., a volatile memory and/or a non-volatile memory) through a system bus 110; memory 104 may include storage locations configured to be addressable through processor 102. In one or more embodiments, data processing device 100 may be a laptop computer, a desktop computer, a notebook computer, a netbook, a tablet or a mobile device such as a mobile phone. Other forms of data processing device 100 are within the scope of the exemplary embodiments discussed herein.

In one or more embodiments, data processing device 100 may include a number of audio endpoint devices $106_{1-N}$ (e.g., speakers, headphones/earphones) related to one or more application(s) executing thereon. Audio endpoint devices $106_{1-N}$ may be interfaced with a soundcard 108 coupled to system bus 110, interfaced with a peripheral bus 112 (or, Input/Output (I/O) bus; Universal Serial Bus (USB) may be an example peripheral bus 112) or coupled to data processing device 100 through a computer network 114. FIG. 1 shows one or more audio endpoint devices $106_{1-N}$ of all of the aforementioned types. Other forms of audio endpoint devices $106_{1-N}$ applicable to the concepts to be discussed herein are within the scope of the exemplary embodiments.

In one or more embodiments, data processing device 100 may have an audio framework (e.g., a software framework) executing thereon. The audio framework may simply tasks related to handling audio data in data processing device 100 and/or audio data over computer network 114. The tasks may be simplified through easing audio capturing and playback. Audio frameworks are well known to one skilled in the art. Detailed discussion associated therewith, therefore, has been skipped for the sake of convenience, clarity and brevity.

In the case of audio endpoint devices $106_{1-N}$ being interfaced with soundcard 108, two modes of operation may be relevant, viz. shared mode and exclusive mode. In the case of the shared mode, multiple applications (e.g., applications $116_{1-M}$ shown as being stored in memory 104) executing on data processing device 100 may share use of an audio endpoint device $106_{1-N}$. For example, a speaker of a mobile phone (an example data processing device 100) may be utilized during an alarm notification, an incoming call notification AND audio/music rendering. In the case of the exclusive mode, an application $116_{1-M}$ may have exclusive use of audio endpoint device $106_{1-N}$ during capturing of audio data (e.g., audio stream) and/or rendering thereof. For example, a gaming application (example application $116_{1-M}$) may be associated with an exclusive mode audio data stream.

In one or more embodiments, data processing device 100 may execute an operating system 118 thereon. FIG. 1 shows operating system 118 as being part of memory 104. In the case of a Windows® operating system (example operating system 118), an application $116_{1-M}$ may be allowed to capture data from a shared mode audio data stream but not an exclusive mode audio data stream. There exist scenarios where a user 150 of data processing device 100 may wish to capture audio data 122 (e.g., shown as part of memory 104; memory 104, here, may be a volatile memory) to an audio endpoint device $106_{1-N}$ (e.g. headphones, speaker, external device). Although the shared mode of operation may enable capturing audio data 122, a desired audio endpoint device $106_{1-N}$ may not support a data format (e.g., an uncompressed Linear Pulse-Code Modulation (LPCM) based format, a Dolby® Digital based format, a Dolby® TrueHD based format) of audio data 122.

Figure 2:
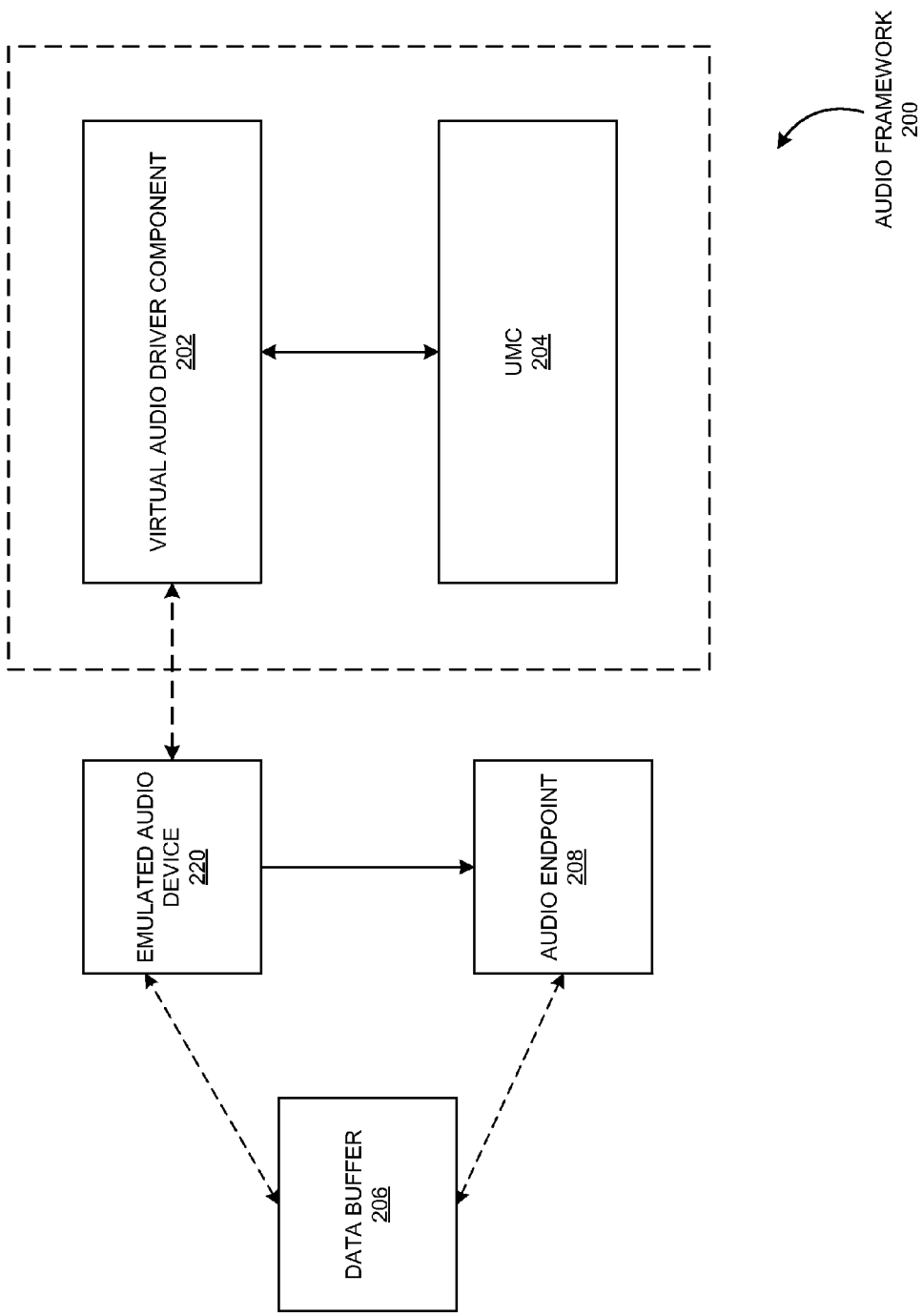
FIG. 2 is a schematic view of an audio framework implemented in the data processing device of FIG. 1, according to one or more embodiments.

FIG. 2 shows an audio framework 200 (e.g., executing on a computing platform provided by processor 102 and memory 104) implemented in data processing device 100 configured to enable capturing audio data 122, according to one or more embodiments. In one or more embodiments, audio framework 200 may provide a means to capture audio data 122 (e.g., audio data being rendered) to an audio endpoint device $106_{1-N}$ and redirect the captured audio data 122 to another audio endpoint device $106_{1-N}$. Also, in one or more embodiments, audio framework 200 may enable capturing of audio data 122 in a data format compatible with the desired audio endpoint device $106_{1-N}$. Further, in one or more embodiments, audio framework 200 may enable capturing of audio data 122 during all modes of operation, viz. the shared mode AND the exclusive mode discussed above.

In one or more embodiments, audio framework 200 may be implemented with a virtual audio driver component 202 and a user mode component (UMC) 204. In one or more embodiments, virtual audio driver component 202 may enable abstracting an audio device 220 (in other words, virtual audio driver component 202 may enable mimicking an audio device 220 to be presented to operating system 118) and registering an audio endpoint 208 associated therewith with operating system 118. Then, in one or more embodiments, virtual audio driver component 202 may enable setting up a data buffer 206 associated with virtual audio device 220 to receive audio data 122 from an application $116_{1-M}$ (e.g., a gaming application); said data buffer 206 may be shared with UMC 204.

In one or more embodiments, UMC 204 may expose one or more Application Programming Interface(s) (API(s)) to application $116_{1-M}$. In one or more embodiments, application $116_{1-M}$ may utilize UMC 204 to request virtual audio driver component 202 to register the desired audio endpoint 208 with operating system 118. In one or more embodiments, application $116_{1-M}$ may have a default audio endpoint device $106_{1-N}$ associated therewith. In one or more embodiments, virtual audio driver component 202 may, therefore, modify default audio endpoint device $106_{1-N}$ to the emulated audio device 220 associated with audio endpoint 208 (in other words, the default audio endpoint may be modified). In one or more embodiments, virtual audio driver component 202 may further enable redirection of audio data 122 from audio endpoint 208 to a new/desired audio endpoint device $106_{1-N}$ (e.g., based on modifying identifier data associated with emulated audio device 220/audio endpoint 208 to the new/desired audio endpoint device $106_{1-N}$).

In one or more embodiments, as data buffer 206 is shared with UMC 204, UMC 204 may be capable of processing audio data 122 therein as per the request of application $116_{1-M}$. For example, audio data 122 may be redirected to the new/desired audio endpoint device $106_{1-N}$ as discussed above. Also, audio data 122 may be converted (e.g., utilizing processor 102) into an appropriate data format compatible with the new/desired audio endpoint device $106_{1-N}$ and/or the original default audio endpoint device $106_{1-N}$ (scenarios may be envisioned in which audio data 122 is incompatible with the original default audio endpoint device $106_{1-N}$). Thus, in one or more embodiments, UMC 204 may serve as an interface to utilize functionalities provided through audio framework 200.

In one or more embodiments, the capability to modify the default audio endpoint device $106_{1-N}$ may not necessarily preclude an original default audio endpoint device $106_{1-N}$ from having audio data 122 rendered thereon. In one or more embodiments, UMC 204 may also enable routing audio data 122 back to the original default audio endpoint device $106_{1-N}$. This may enable maintaining an experience of user 150 on data processing device 100 while still redirecting audio data 122 to the new/desired audio endpoint device $106_{1-N}$. Further, in one or more embodiments, the redirection of audio data 122 to the new/desired endpoint device $106_{1-N}$ discussed above may be performed when the original default audio endpoint device $106_{1-N}$ does not support a data format of audio data 122. Other scenarios are also within the scope of the exemplary embodiments discussed herein.

Figure 3:
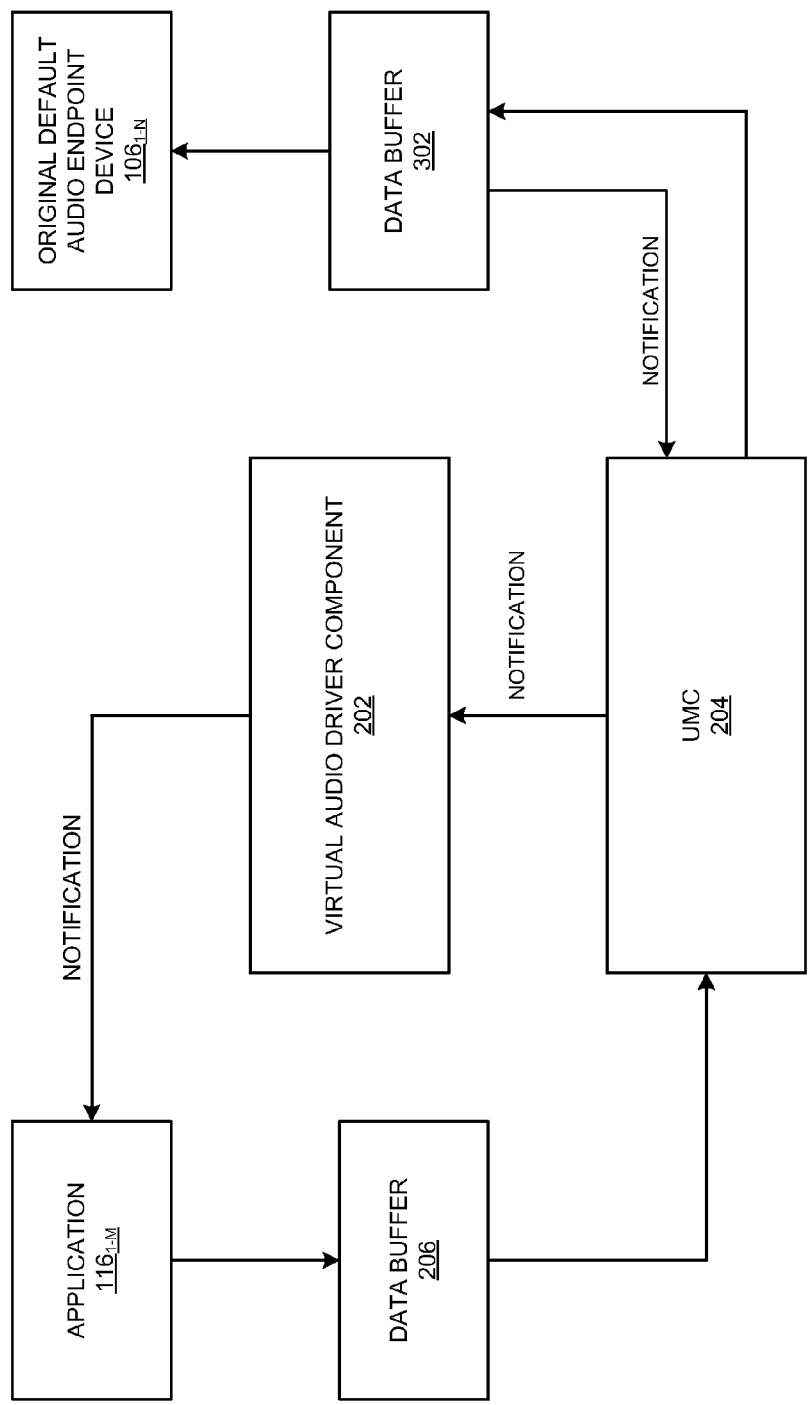
FIG. 3 is a schematic view of an audio capture session in the audio framework of FIG. 2 initiated through an application executing on the data processing device of FIG. 1, according to one or more embodiments.

FIG. 3 illustrates an audio capture session initiated through an application $116_{1-M}$ serving as a "client," according to one or more embodiments. In accordance with the initiation, UMC 204 may scan a current default audio end point device $106_{1-N}$ and capabilities thereof (e.g., audio format supported). UMC 204 may then request virtual audio driver component 202 to register an audio endpoint (e.g., audio endpoint 208) with the requisite capabilities with operating system 118 as the default audio endpoint device $106_{1-N}$ instead of the original default audio endpoint device $106_{1-N}$. Thus, virtual audio driver component 202 may enable an emulated audio device 220 become the default audio endpoint device $106_{1-N}$.

Here, when audio data 122 is being rendered by application $116_{1-M}$, an audio stream may be opened in virtual audio driver component 202 and data buffer 206 set up to receive a stream of audio data 122 therein. Data buffer 206 may then be shared with UMC 204. UMC 204 may also open an audio stream at the original default audio endpoint device $106_{1-N}$. As data buffer 206 is mapped to UMC 204, a chunk of data therein may be placed in a data buffer 302 associated with the original default audio endpoint device $106_{1-N}$. Now, the consumption of the placed chunk of data by the original default audio endpoint device $106_{1-N}$ may trigger a notification to UMC 204 through virtual audio driver component 202; thus, more data may be consumed from data buffer 206. Virtual audio driver component 202 may, in turn, report the notification events to operating system 118.

In one or more embodiments, the entire capturing process may be transparent to an end user (e.g., user 150); the final audio output may come from a same audio endpoint device $106_{1-N}$ as before the start of the audio capturing process. The control and capture of audio data 122 to any audio endpoint device $106_{1-N}$ may be made possible through the exemplary embodiments discussed herein. Further, the control and capture of both shared mode audio streams AND exclusive mode audio streams may be possible through the exemplary embodiments discussed herein. Last but not the least, format conversion of audio data 122 may be enabled through the exemplary embodiments discussed herein based on the capture thereof.

In one or more embodiments, instructions associated with audio framework 200 and/or one or more components thereof may be tangibly embodied on a non-transitory medium (e.g., a Compact Disc (CD), a Digital Video Disc (DVD), a Blu-ray® disc, a hard drive; appropriate instructions may be downloaded to the hard drive) readable through data processing device 100. Also, in one or more embodiments, the aforementioned instructions may be packaged with operating system 118 and/or an application $116_{1-M}$ executing on data processing device 100. All reasonable variations are within the scope of the exemplary embodiments discussed herein.

Figure 4:
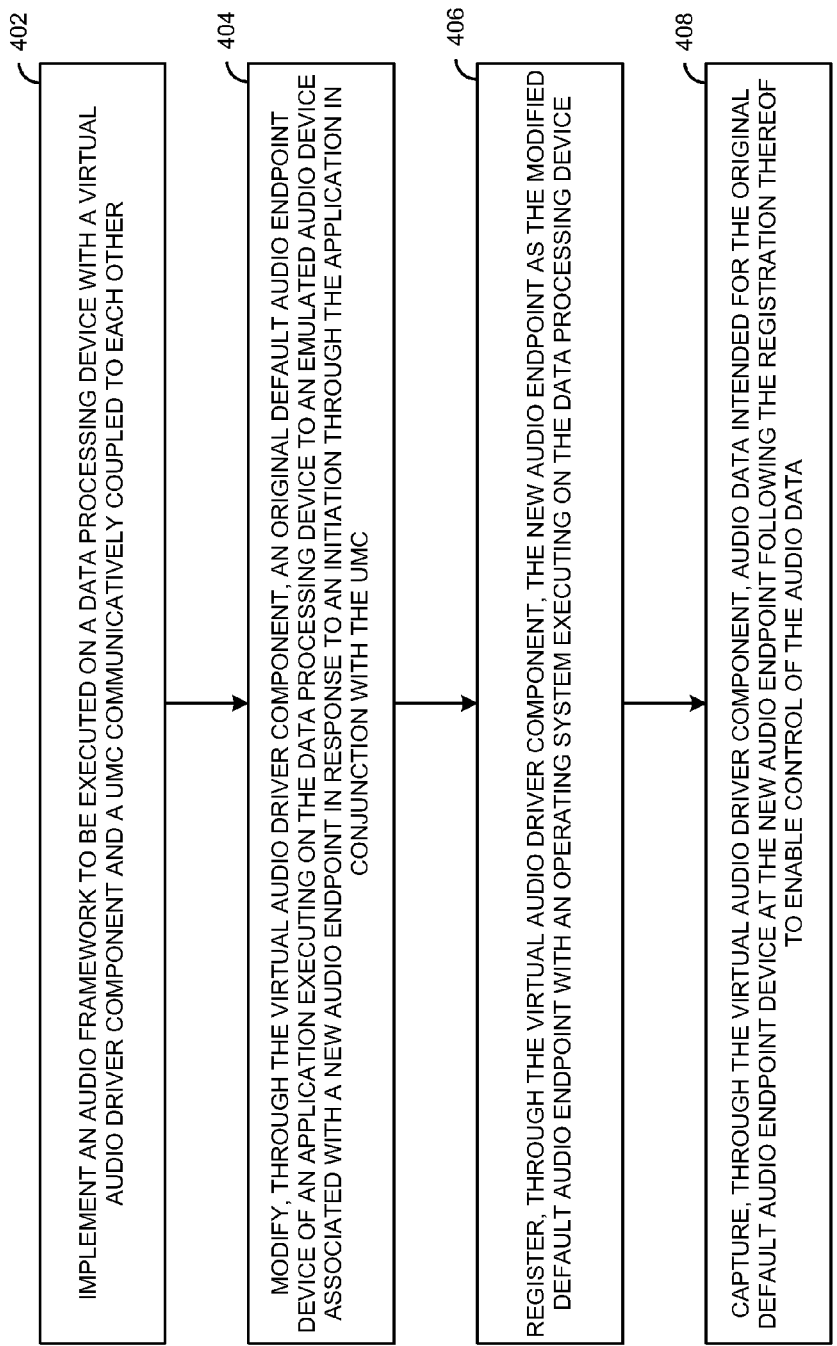
FIG. 4 is a process flow diagram detailing the operations involved in control and capture of audio data intended for an audio endpoint device of an application executing on the data processing device of FIG. 1, according to one or more embodiments.

FIG. 4 shows a process flow diagram detailing the operations involved in control and capture of audio data 122 intended for an audio endpoint device $106_{1-N}$ of an application $116_{1-M}$ executing on data processing device 100, according to one or more embodiments. In one or more embodiments, operation 402 may involve implementing audio framework 200 to be executed on data processing device 100 with virtual audio driver component 202 and UMC 204 communicatively coupled to each other. In one or more embodiments, data processing device 100 may include processor 102 communicatively coupled to memory 104. In one or more embodiments, operation 404 may involve modifying, through virtual audio driver component 202, an original default audio endpoint device $106_{1-N}$ of application $116_{1-M}$ executing on data processing device 100 to an emulated audio device 220 associated with a new audio endpoint 208 in response to an initiation through application $116_{1-M}$ in conjunction with UMC 204.

In one or more embodiments, operation 406 may involve registering, through virtual audio driver component 202, new audio endpoint 208 as the modified default audio endpoint with operating system 118. In one or more embodiments, operation 408 may then involve capturing, through virtual audio driver component 202, audio data 122 intended for the original default audio endpoint device $106_{1-N}$ at new audio endpoint 208 following the registration thereof to enable control of audio data 122.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device 100). Accordingly, the specification and drawings are to be regarded in an illustrative rather than a restrictive sense.

What is claimed is:

1. A method comprising:
   implementing an audio framework to be executed on a data processing device with a virtual audio driver component and a User Mode Component (UMC) communicatively coupled to each other, the data processing device including a processor communicatively coupled to a memory;
   modifying, through the virtual audio driver component, an original default audio endpoint device of an application executing on the data processing device to an emulated audio device associated with a new audio endpoint in response to an initiation through the application in conjunction with the UMC;
   registering, through the virtual audio driver component, the new audio endpoint as the modified default audio endpoint with an operating system executing on the data processing device; and
   capturing, through the virtual audio driver component, audio data intended for the original default audio endpoint device at the new audio endpoint following the registration thereof to enable control of the audio data, the capturing comprising:

setting up a data buffer associated with the emulated audio device to receive a stream of the audio data;

sharing the data buffer with the UMC; and placing a chunk of data in the data buffer into another data buffer associated with the original default audio endpoint device based on a mapping between the data buffer and the UMC.

2. The method of claim 1, further comprising at least one of:

opening, through the UMC, an audio stream at the original default audio endpoint device;

triggering, through the virtual audio driver component, a notification of consumption of the chunk of data to the UMC; and updating, through the virtual audio driver component, the operating system with an event related to the notification.

3. The method of claim 1, further comprising redirecting, through the virtual audio driver component, the captured audio data at the new audio endpoint to another audio endpoint device of the application.

4. The method of claim 2, further comprising routing, through the virtual audio driver component, the captured audio data at the new audio endpoint back to the original default audio endpoint device based on the consumption of the chunk of data in the another data buffer.

5. The method of claim 1, further comprising performing, through the processor aided by the virtual audio driver component, a format conversion of the captured audio data to render the converted captured audio data compatible with at least one of: the original default audio endpoint device and another audio endpoint device of the application.

6. The method of claim 1, wherein the audio data is capable of being a shared mode audio stream and an exclusive mode audio stream, the shared mode audio stream being an audio stream in a shared mode of multiple applications executing on the data processing device being configured to share use of an audio endpoint device, and the exclusive mode audio stream being an audio stream in an exclusive mode of the application executing on the data processing device being configured to have exclusive use of the audio endpoint device.

7. A non-transitory medium, readable through a data processing device and including instructions embodied therein that are executable through the data processing device, comprising:

instructions to implement an audio framework to be executed on the data processing device with a virtual audio driver component and a UMC communicatively coupled to each other, the data processing device including a processor communicatively coupled to a memory;

instructions to modify, through the virtual audio driver component, an original default audio endpoint device of an application executing on the data processing device to an emulated audio device associated with a new audio endpoint in response to an initiation through the application in conjunction with the UMC;

instructions to register, through the virtual audio driver component, the new audio endpoint as the modified default audio endpoint with an operating system executing on the data processing device; and instructions to capture, through the virtual audio driver component, audio data intended for the original default audio endpoint device at the new audio endpoint following the registration thereof to enable control of the audio data, the instructions to capture comprising:

instructions to set up a data buffer associated with the emulated audio device to receive a stream of the audio data;

instructions to share the data buffer with the UMC; and instructions to place a chunk of data in the data buffer into another data buffer associated with the original default audio endpoint device based on a mapping between the data buffer and the UMC.

8. The non-transitory medium of claim 7, further comprising at least one of:

instructions to open, through the UMC, an audio stream at the original default audio endpoint device;

instructions to trigger, through the virtual audio driver component, a notification of consumption of the chunk of data to the UMC; and instructions to update, through the virtual audio driver component, the operating system with an event related to the notification.

9. The non-transitory medium of claim 7, further comprising instructions to redirect, through the virtual audio driver component, the captured audio data at the new audio endpoint to another audio endpoint device of the application.

10. The non-transitory medium of claim 8, further comprising instructions to route, through the virtual audio driver component, the captured audio data at the new audio endpoint back to the original default audio endpoint device based on the consumption of the chunk of data in the another data buffer.

11. The non-transitory medium of claim 7, further comprising instructions to perform, through the processor aided by the virtual audio driver component, a format conversion of the captured audio data to render the converted captured audio data compatible with at least one of: the original default audio endpoint device and another audio endpoint device of the application.

12. A data processing device comprising:

a memory;

a processor communicatively coupled to the memory; and an audio framework executing on a computing platform provided through the processor and the memory, the audio framework being implemented with a virtual audio driver component and a UMC communicatively coupled to each other, and the virtual audio driver component being configured to enable:

modifying an original default audio endpoint device of an application executing on the data processing device to an emulated audio device associated with a new audio endpoint in response to an initiation through the application in conjunction with the UMC, registering the new audio endpoint as the modified default audio endpoint with an operating system executing on the data processing device, capturing audio data intended for the original default audio endpoint device at the new audio endpoint following the registration thereof to enable control of the audio data;

setting up a data buffer associated with the emulated audio device to receive a stream of the audio data, sharing the data buffer with the UMC, and placing a chunk of data in the data buffer into another data buffer associated with the original default audio endpoint device based on a mapping between the data buffer and the UMC.

13. The data processing device of claim 12, wherein the multimedia framework is further configured to enable at least one of:

opening, through the UMC, an audio stream at the original default audio endpoint device, triggering, through the virtual audio driver component, a notification of consumption of the chunk of data to the UMC, and updating, through the virtual audio driver component, the operating system with an event related to the notification.

14. The data processing device of claim 12, wherein the virtual audio driver component is further configured to enable redirecting the captured audio data at the new audio endpoint to another audio endpoint device of the application.

15. The data processing device of claim 13, wherein the virtual audio driver component is further configured to enable routing the captured audio data at the new audio endpoint back to the original default audio endpoint device based on the consumption of the chunk of data in the another data buffer.

16. The data processing device of claim 12, wherein the processor, aided by the virtual audio driver component, is further configured to execute instructions to perform a format conversion of the captured audio data to render the converted captured audio data compatible with at least one of: the original default audio endpoint device and another audio endpoint device of the application.

17. The data processing device of claim 12, wherein the audio data is capable of being a shared mode audio stream and an exclusive mode audio stream, the shared mode audio stream being an audio stream in a shared mode of multiple applications executing on the data processing device being configured to share use of an audio endpoint device, and the exclusive mode audio stream being an audio stream in an exclusive mode of the application executing on the data processing device being configured to have exclusive use of the audio endpoint device.

\* \* \* \* \*